(12) United States Patent
Vincent et al.

(10) Patent No.: US 9,996,968 B2
(45) Date of Patent: Jun. 12, 2018

(54) METHOD AND SYSTEM FOR PERFORMING RENDERING USING FIRST AND SECOND PROJECTIONS

(75) Inventors: Thomas Vincent, Brossard (CA); Tristan Lapalme, Granby (CA)

(73) Assignee: CADENS MEDICAL IMAGING INC., Granby, Quebec (CA)

( * ) Notice: Subject to any disclaimer, the term of this patent is extended or adjusted under 35 U.S.C. 154(b) by 922 days.

(21) Appl. No.: 14/233,218

(22) PCT Filed: Jul. 18, 2012

(86) PCT No.: PCT/CA2012/000684
§ 371 (c)(1),
(2), (4) Date: Apr. 23, 2014

(87) PCT Pub. No.: WO2013/010261
PCT Pub. Date: Jan. 24, 2013

(65) Prior Publication Data
US 2015/0161817 A1    Jun. 11, 2015

(51) Int. Cl.
*G06T 15/20*     (2011.01)
*G06T 15/06*     (2011.01)
(Continued)

(52) U.S. Cl.
CPC .............. *G06T 15/20* (2013.01); *G06T 15/06* (2013.01); *G06T 15/08* (2013.01); *G06T 17/00* (2013.01);
(Continued)

(58) Field of Classification Search
CPC .... G06T 19/003; G06T 2210/41; G06T 15/20
See application file for complete search history.

(56) References Cited

U.S. PATENT DOCUMENTS 5,782,762 A   7/1998   Vining
5,891,030 A   4/1999   Johnson et al.
(Continued)

FOREIGN PATENT DOCUMENTS

| CN | 101006469 A | 7/2007 |
|---|---|---|
| JP | 2004021307 A | 1/2004 |
| JP | 2011-135937 A | 7/2011 |

OTHER PUBLICATIONS

Zheng, J. Yu, Yu Zhou, and Panayiotis Mili. "Scanning scene tunnel for city traversing." IEEE Transactions on Visualization and Computer Graphics 12.2 (2006): 155-167.*
Sheikh, S., D. S. Paik, and C. F. Beaulieu. "Wide-Angle Virtual Endoscopy with Multiple-View Rendering: The Virtual Cockpit. RSNA-EJ." (1998).; retrieved using the Wayback Machine (www.archive.org).*

(Continued)

*Primary Examiner* — Daniel Hajnik
(74) *Attorney, Agent, or Firm* — Pearl Cohen Zedek Latzer Baratz LLP

(57) ABSTRACT

A method and system for performing rendering at a given viewpoint of at least one portion of visual areas blinded to a perspective rendering at the given viewpoint are disclosed, the method comprising providing a projection model comprising a first part used for rendering far view and a second part for rendering near view such that at least one portion of the visual areas is rendered using the second part of the projection model and further wherein a transition between the first part of the projection model and the second part of the projection model is characterized by projection vectors substantially similar, obtaining image data, performing a first projection of at least one part of the image data according to the first part of the projection model to generate first projected data, performing a second projection of another part of the image data according to the second part of the projection model to generate second projected data and displaying projected data using the first projected data and the second projected data.

15 Claims, 14 Drawing Sheets

(51) Int. Cl.
*G06T 17/00* (2006.01)
*G06T 19/00* (2011.01)
*G06T 15/08* (2011.01)

(52) U.S. Cl.
CPC ........ *G06T 19/003* (2013.01); *G06T 2210/41* (2013.01)

(56) References Cited

U.S. PATENT DOCUMENTS

| | | | |
|---|---|---|---|
| 6,611,282 B1 | 8/2003 | Trubko et al. | |
| 6,694,163 B1 | 2/2004 | Vining | |
| 6,947,039 B2 | 9/2005 | Gerritsen et al. | |
| 7,554,573 B2 | 6/2009 | Mizusawa | |
| 7,609,910 B2 | 10/2009 | Geiger et al. | |
| 2005/0226483 A1* | 10/2005 | Geiger .................... | G06T 15/08 382/128 |
| 2009/0177050 A1* | 7/2009 | Griffiths ................. | A61B 6/481 600/301 |
| 2010/0142788 A1 | 6/2010 | Matsumoto | |
| 2011/0116692 A1 | 5/2011 | Dekel et al. | |

OTHER PUBLICATIONS

International Search Report for International Application No. PCT/CA2012/000684, dated Feb. 1, 2013.

Summers, Ronald M. "Improving the Accuracy of CT Colonography Interpretation: Computer-Aided Diagnosis," Gastrointestinal Endoscopy Clinics of North America, Apr. 2010, vol. 20 (2): pp. 245-257.

Beaulieu, Christopher F. et al. "Display Modes for CT Colonography. Part II. Blinded comparison of axial CT and virtual endoscopic and panoramic endoscopic volume-rendered studies," Radiology, vol. 212(1), pp. 203-212, Jul. 1999.

Beaulieu, Christopher F., Advanced 3D Display Methods, Atlas of Virtual Colonoscopy, pp. 53-64, 2003.

Extended European Search Report for European Patent Application No. 12814123.1, dated Feb. 2, 2015.

Office Action for Chinese Patent Application No. 2012800356956, dated Oct. 28, 2015.

Office Action for Japanese Patent Application No. 2014-520472, dated Jul. 5, 2016.

* cited by examiner

METHOD AND SYSTEM FOR PERFORMING RENDERING USING FIRST AND SECOND PROJECTIONS

CROSS-REFERENCE TO RELATED APPLICATIONS

This patent application is a National Phase Application of PCT International Patent Application No. PCT/CA2012/000684, International Filing Date Jul. 18, 2012, which claims priority of U.S. provisional patent application No. 61/509,092, entitled "Method and system for performing rendering" that was filed on Jul. 18, 2011, which is hereby incorporated by reference.

FIELD OF THE INVENTION

The present invention is directed to systems and methods for creating enhanced visualization of volumetric image, more particularly to systems and methods for creating three-dimensional display of volumetric image of objects such as hollow organs.

BACKGROUND OF THE INVENTION

Virtual endoscopy, also known as Computer Tomography (CT) endoscopy is a non-invasive diagnostic procedure allowing the inspection of inner and outer surfaces of anatomical structures in the human body. Recently, such procedure has been used to investigate hollow organs such as the colon as suggested by U.S. Pat. No. 6,694,163 & and U.S. Pat. No. 5,891,030, during colorectal cancer screening. This procedure is known as virtual colonoscopy or CT colonoscopy.

Originally, CT colonoscopy mimicked Optical Colonoscopy by creating a virtual environment representing a 3D view of the inner part of the colon as detailed in U.S. Pat. No. 5,782,762, involving a perspective rendering of the 3D environment. However, it mimicked as well the very limitation of optical colonoscopy, that is being blind to areas located out-of the reach of optical rays, such as behind haustral folds or located between deep folds.

Thus, new techniques emerged to increase the amount of colonic mucosa visualized through a virtual camera, amongst which (1) flat colon techniques detailed in U.S. Pat. No. 5,891,030 [030], (2) cube view detailed in U.S. Pat. No. 6,947,039 (hereinafter '039) shown in FIG. 1a, (3) panoramic projection detailed in U.S. Pat. No. 7,609,910 (hereinafter '910) shown in FIGS. 1b and 1c, (4) unfolded colon projection detailed in US Patent Application 2011/0116692 (hereinafter '692) and more recently (5) object diameter-specific cylindrical projection techniques limiting the distortion of the colon inner section as detailed in US Patent Application 2010/0142788 (hereinafter '788).

Techniques detailed in '030, '692 & '788 have a common limitation, that is a paradigm shift related to the human perception of objects from perspective 3D projections to 2D projections. These techniques introduce visual distortion in shapes, that requires observers to re-learn how to interpret the information, and eventually that may negatively impact the colonic mucosa evaluation. In addition, '692 and '788 aim at reducing these artifacts, but require the evaluation of a limited section of the colon. This leads to two limitations which are an increased reviewing time, and a decrease visual exposition to lesions as opposed to longer exposition in traditional perspective projections.

Furthermore, technique detailed in '039 has an inherent drawback which is the constant exposition of front and back projections, similar to always watching a rear-mirror while driving. In addition, and because only cube views are involved to represent a complete 360 environment, some objects can be partially present in multiple edges of different cube views. These two drawbacks are a clear limitation to the technique leading to a non efficient clinical reading paradigm.

An evolution of '039 to overcome the split-view of edge objects, and the information overflow, is detailed in '910. The technique involves distorting some of the cube views and assembles them around the Front-view, while removing the Back-view. Intrinsically, and although '039 proposes two different layouts, the distortion are non-homogeneous in the image along radial image lines starting at the center of the Front-view; the distortion implies that an identical object will be seen differently depending on where it is positioned in the "distorted assembled view", creating additional artifacts for the observer. Furthermore, the cube-view distortion does not provide a practical alternative solution in case colonic folds are really compact in a specific region as the limited and non-linearly distorted field-of-view will remain blind to most of the information. Finally, '039 requires a mapping process that either delete, interpolate or somehow alter the original information in order to have it fit into the final assembled space, increasing processing time and intrinsically altering the clinical information.

There is a need a method and apparatus that will overcome at least one of the above-identified drawbacks.

Features of the invention will be apparent from review of the disclosure, drawings and description of the invention below.

BRIEF SUMMARY OF THE INVENTION

In accordance with one aspect of the invention, there is provided a method for performing rendering at a given viewpoint of at least one portion of visual areas blinded to a perspective rendering at the given viewpoint, the method comprising providing a projection model comprising a first part used for rendering far view and a second part for rendering near view such that at least one portion of the visual areas is rendered using the second part of the projection model and further wherein a transition between the first part of the projection model and the second part of the projection model is characterized by projection vectors substantially similar; obtaining image data; performing a first projection of at least one part of the image data according to the first part of the projection model to generate first projected data; performing a second projection of another part of the image data according to the second part of the projection model to generate second projected data and displaying projected data using the first projected data and the second projected data.

In accordance with another aspect of the invention, there is provided a method for performing rendering at a given viewpoint of at least one portion of visual areas blinded to a perspective rendering at the given viewpoint, the method comprising providing image data; performing a first projection of at least one part of the image data according to a first part of a projection model, the projection model comprising the first part used for rendering far view and a second part for rendering near view such that at least one portion of the visual areas is rendered using the second part of the projection model and further wherein a transition between the first part of the projection model and the second part of the projection model is characterized by projection vectors substantially similar; performing a second projection of another part of the image data according to the second part of the projection model to generate second projected data; providing projected data comprising the first projected data and the second projected data.

In accordance with one embodiment, the providing of the image data comprises receiving the image data from a device selected from a group consisting of a magnetic resonance imaging (MRI) device, a positron emission tomography (PET) device, an X-rays device, an ultrasound device and any combination thereof.

In accordance with another embodiment, the providing of the projected data comprises displaying the projected data on a screen.

In accordance with another embodiment, the providing of the projected data comprises performing at least one of storing the projected data and transmitting the projected data to a remote location.

In accordance with an embodiment, the providing of the image data comprises receiving the image data from a DICOM server.

In accordance with an embodiment, the first part of the projection model comprises a semisphere portion of a semispherical projection model and the second part of the projection model comprises a cylindrical projection model.

In accordance with another embodiment, the semispherical projection model is characterized by:

$$0 \leq r \leq R1 = Rc\ \overrightarrow{n(r)} \begin{cases} r/Rs \\ \theta \\ \sqrt{Rs^2 - r^2}/Rs \end{cases}.$$

In accordance with one embodiment, the cylindrical projection model is characterized by:

$$Rc = R1 \leq r \leq R3 = 3 \cdot Rc\ \overrightarrow{n(r)} \begin{cases} Rc/\sqrt{Rc^2 + (r - R2)^2} \\ \theta \\ (r - R2)/\sqrt{Rc^2 + (r - R2)^2} \end{cases}.$$

In accordance with an embodiment, the first part of the projection model comprises a portion of an ellipsoid projection model and the second part of the projection model comprises a curved cylindrical projection model.

In accordance with an embodiment, each of the first part of the projection model and the second part of the projection model is symmetrical around an axis extending from the given viewpoint to a projected viewpoint.

In accordance with an aspect of the invention, there is provided a computer-readable storage medium storing computer-executable instructions which, when executed, cause a processing device to perform a method as disclosed above.

In accordance with an embodiment, the method disclosed above is used for performing a fly-through.

In accordance with an aspect of the invention, there is disclosed a system for performing rendering at a given viewpoint of at least one portion of visual areas blinded to a perspective rendering at the given viewpoint, the system comprising an image data providing unit for receiving and providing image data; a first projection performing unit for performing a projection of at least one part of the provided image data according to a first part of a projection model, the projection model comprising the first part used for rendering far view and a second part for rendering near view such that at least one portion of the visual areas is rendered using the second part of the projection model and further wherein a transition between the first part of the projection model and the second part of the projection model is characterized by projection vectors substantially similar, the first projection performing unit further providing a first projected data; a second projection performing unit for performing a projection of another part of the provided image data according to the second part of the projection model and for providing a second projected data; a projected data providing unit for receiving the first projected data and the second projected data, for generating projected data using the first projected data and the second projected data and for providing the projected data to thereby render at least one portion of visual areas blinded to a perspective rendering at the given viewpoint.

In accordance with one aspect of the invention, there is disclosed a system for performing rendering at a given viewpoint of at least one portion of visual areas blinded to a perspective rendering at the given viewpoint, the system comprising a display device; an image data providing unit; a central processing unit; a memory comprising a program, wherein the program is stored in the memory and configured to be executed by the central processing unit, the program comprising instructions for obtaining image data from the image data providing unit; instructions for performing a first projection of at least one part of the image data according to a first part of a projection model, the projection model comprising the first part used for rendering far view and a second part for rendering near view such that at least one portion of the visual areas is rendered using the second part of the projection model and further wherein a transition between the first part of the projection model and the second part of the projection model is characterized by projection vectors substantially similar; instructions for performing a second projection of another part of the image data according to the second part of the projection model to generate second projected data; and instructions for generating projected data using the first projected data and the second projected data; instructions for providing the generated projected data to the display device.

In accordance with one embodiment the system further comprises an output device, further wherein the program comprises instructions for transmitting the generated projected data to the output device.

An advantage of the method disclosed herein is that it enables the creation of a perspective projection which mimics that of traditional endoscopes, which efficiently render areas blinded to endoscopes with minimal distortion either on shapes or on the reviewer's perception.

An advantage of the method disclosed herein when used in a CT colonography is that it increases an amount of colonic mucosa inspected during a single pass compared to prior art while preventing major distortions and non-linearities generated due to the rendering of prior art typical or flat, unfolded or cube projections.

Another advantage of the method disclosed herein is that it may enable linear radial distortion matching the human perception.

BRIEF DESCRIPTION OF THE DRAWINGS

In order that the invention may be readily understood, embodiments of the invention are illustrated by way of example in the accompanying drawings.

FIG. 6a is a schematic which shows a side elevation view of an ellipsoid projection model and a semispherical projection model while

FIG. 8c is a screenshot showing an example of projected image generated using the projection model disclosed in FIG. 8a.

DETAILED DESCRIPTION OF PREFERRED EMBODIMENTS

In the following description of the embodiments, references to the accompanying drawings are by way of illustration of an example by which the invention may be practiced. It will be understood that other embodiments may be made without departing from the scope of the invention disclosed.

Figure 1A:
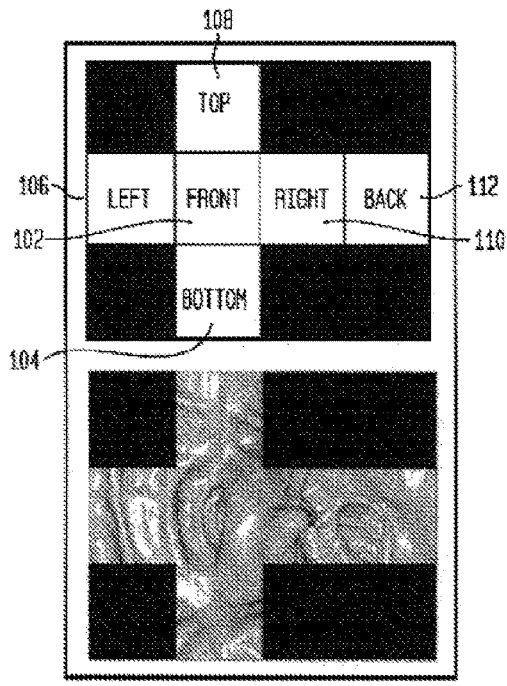
FIGS. 1a, 1b and 1c are figures originating from prior art references.
Figure 1B:
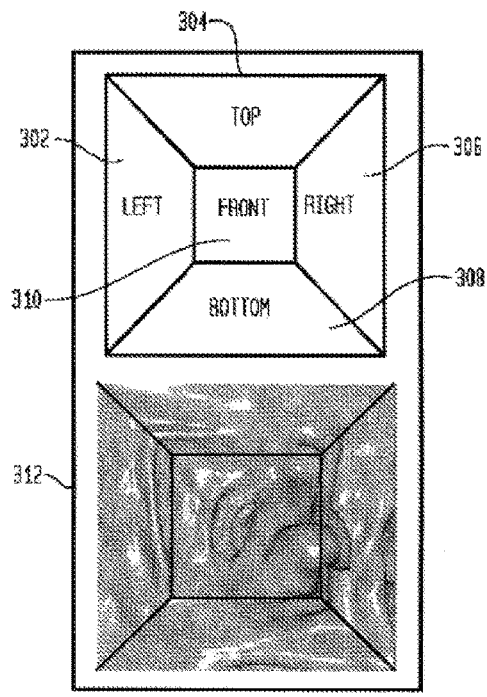
Figure 1C:
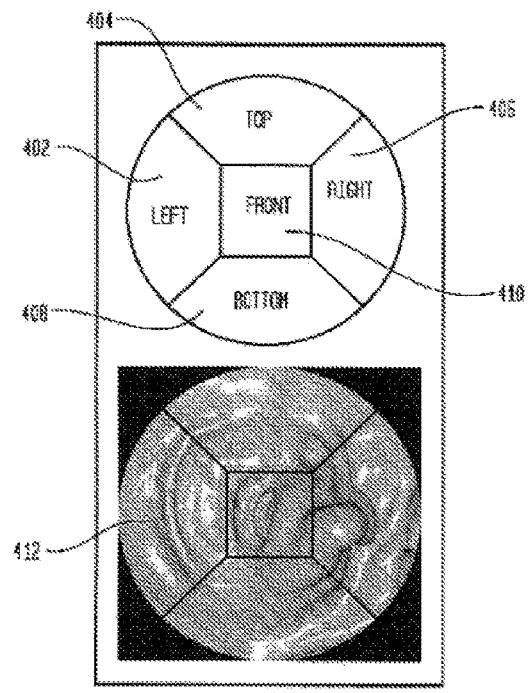
Figure 2A:
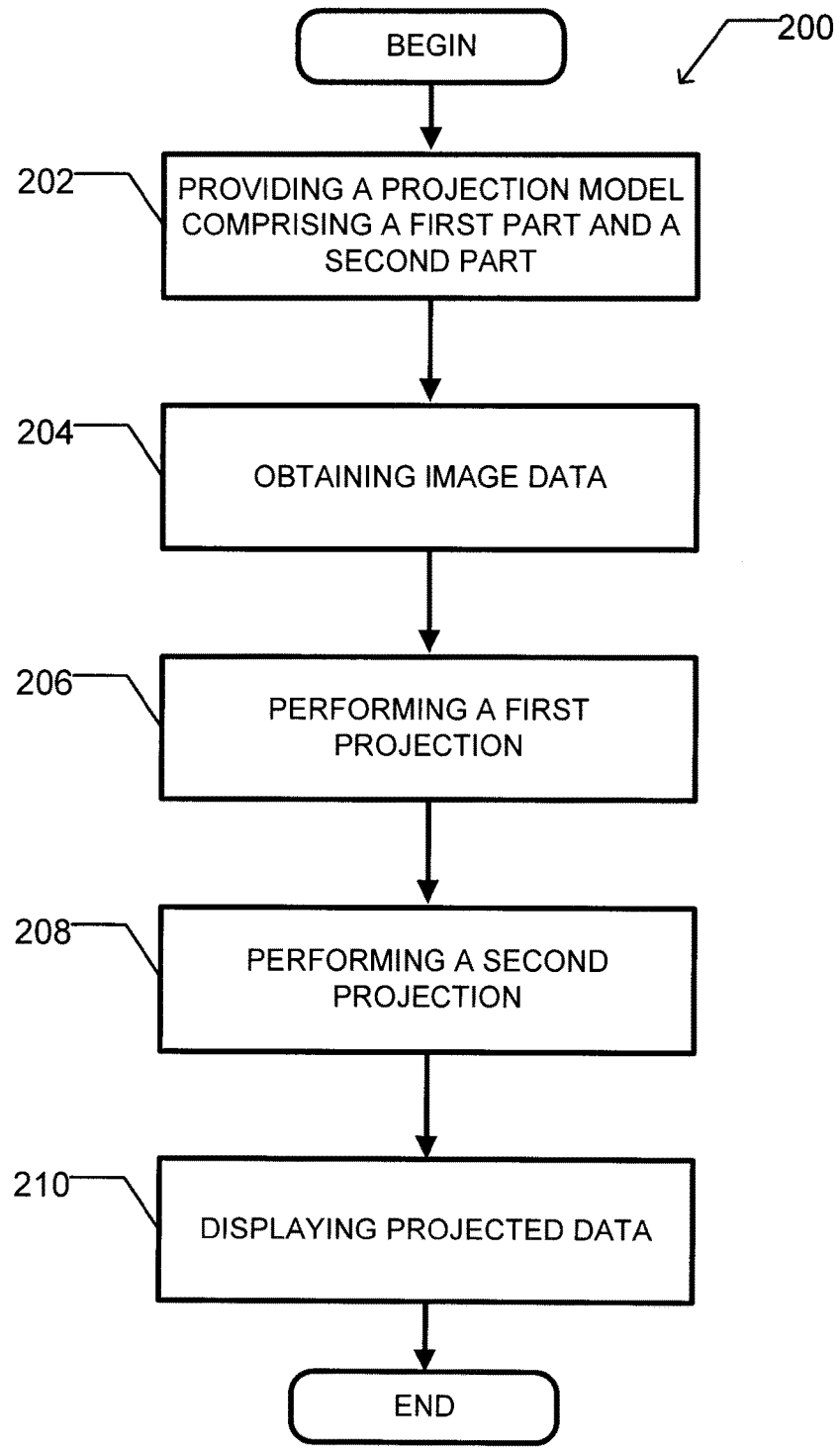
FIG. 2a is a flowchart which shows a first embodiment of a method for performing rendering at a given view point.

Now referring to FIG. 2a, there is shown a first embodiment of a method for performing rendering at a given viewpoint of at least one portion of visual areas blinded to a perspective rendering at the given viewpoint.

When used in the context of a CT colonography, it will be appreciated that the method disclosed herein will be particularly useful for increasing the amount of colonic mucosa inspected during a single pass compared to prior art while preventing major distortions and non-linearities due to the rendering of prior art typical or flat, unfolded or cube projections which is a great advantage.

More precisely and according to processing step 202, a projection model comprising a first part used for rendering far view and a second part for rendering near view is provided. It will be appreciated that, in one embodiment, far view will be understood as an area covered using a prior art perspective projection.

It will be appreciated that at least one portion of the visual areas is rendered using the second part of the projection model. It will be further appreciated that a transition between the first part of the projection model and the second part of the projection model is characterized by projection vectors substantially similar. The skilled addressee will appreciate that this is of great advantage as further explained below.

Figure 11:
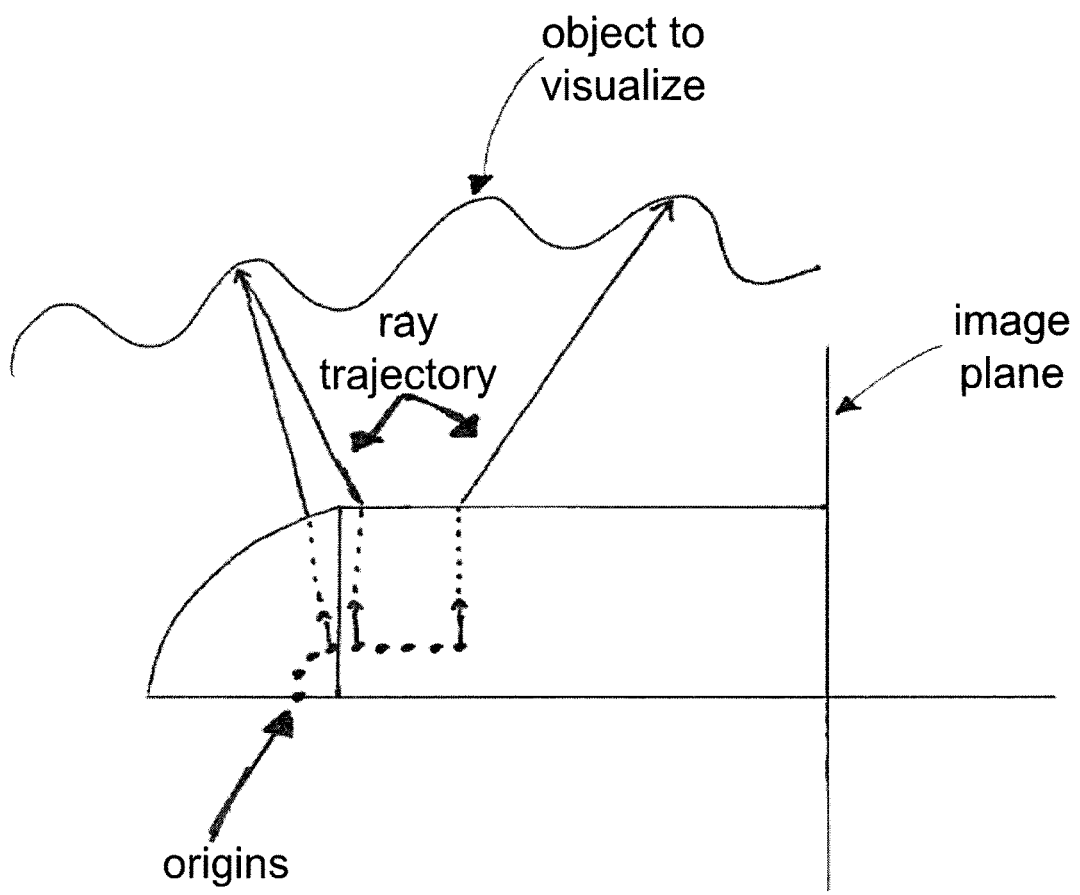
FIG. 11 is a drawing which shows projection vectors for the specific case of a projection model involving a semi-spherical projection model and a cylindrical projection model. It illustrates two substantially similar vectors at the transition zone of the projection models.

Projection vectors are characterized by the combination of two elements; the origin of a projection ray, and the ray trajectory to the object to be rendered as illustrated for instance in FIG. 11. Still referring to FIG. 11, it will be appreciated that this figure shows projection vectors for the specific case of a projection model involving a semi-spherical projection and a cylindrical projection model. It illustrates two substantially similar vectors at the transition zone. The skilled addressee will appreciate that the ray trajectory may, in some embodiment, not align with the projection of the origin point on the projection model. Furthermore, the skilled addressee will appreciate that the origin point may be associated to the near plane elements used in state-of-the-art 3D rendering techniques such as ray-casting.

While various embodiments will be disclosed herein below, it will be appreciated that in a preferred embodiment the first part of the projection model is characterized by the equation:

Semi-Spherical Projection Model $$0 \leq r \leq R1 = Rc \ \overrightarrow{n(r)} \begin{cases} r/Rs \\ \theta \\ \sqrt{Rs^2 - r^2}/Rs \end{cases}$$

Still in a preferred embodiment, the second part of the projection model is characterized by the equation:

Cylindrical Projection Model $$Rc = R1 \leq r \leq R3 = 3 \cdot Rc \ \overrightarrow{n(r)} \begin{cases} Rc/\sqrt{Rc^2 + (r-R2)^2} \\ \theta \\ (r-R2)/\sqrt{Rc^2 + (r-R2)^2} \end{cases}$$

Figure 12:
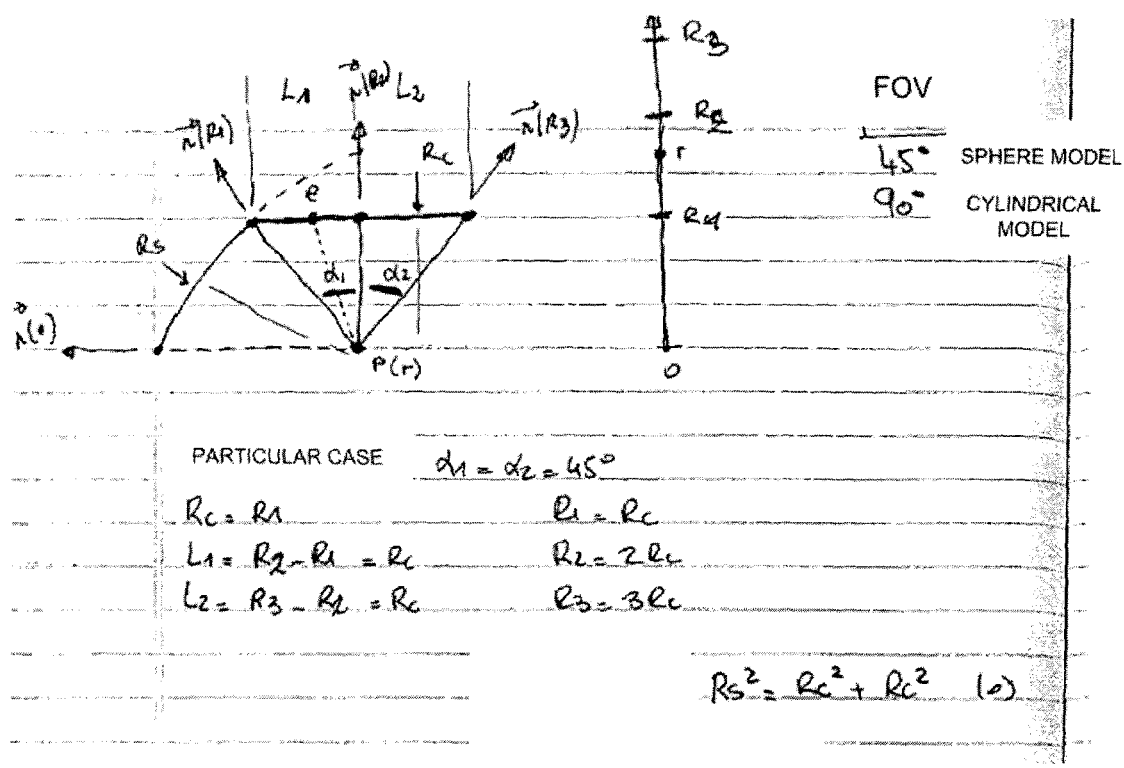
FIG. 12 is a drawing which shows one embodiment of the present invention where one part of the projection is a semi-spherical projection model for the far view, featuring a field of view (FOV) of 45 degrees, and a cylindrical projection model for the near view, featuring a FOV of 90 degrees.

FIG. 12 illustrates the semi-spherical and cylindrical projection models used in the above embodiment.

Still referring to FIG. 2a and according to processing step 204, image data is obtained. It will be appreciated that the image data may be obtained from various sources. In a preferred embodiment, the image data is received from a device selected from a group consisting of an X-rays device, a magnetic resonance imaging (MRI) device, an ultrasound device, a positron emission tomography (PET) device and any combination thereof. Alternatively, the image data may be provided by DICOM storage servers.

According to processing step 206, a first projection of at least one part of the image data is performed according to the first part of the projection model. Corresponding first projected data is generated from the first projection.

Still referring to FIG. 2a and according to processing step 208, a second projection of another part of the image data is performed according to the second part of the projection model. Corresponding second projected data is generated from the second projection.

According to processing step 210, projected data is displayed using the first projected data and the second projected data.

It will be appreciated that the projected data comprises the first projected data and the second projected data. It will be appreciated by the skilled addressee that the generation of the projected data using the first projected data and the second projected data does not require modifying at least one of the first projected data and the second projected data. This is of great advantage over the prior art since the risk of losing information when modifying the data is reduced and also since the amount of processing resources required for generating the projected data is limited, i.e. extra amount of processing resources is not required for modifying at least one of the first projected data and the second projected data.

Figure 2B:
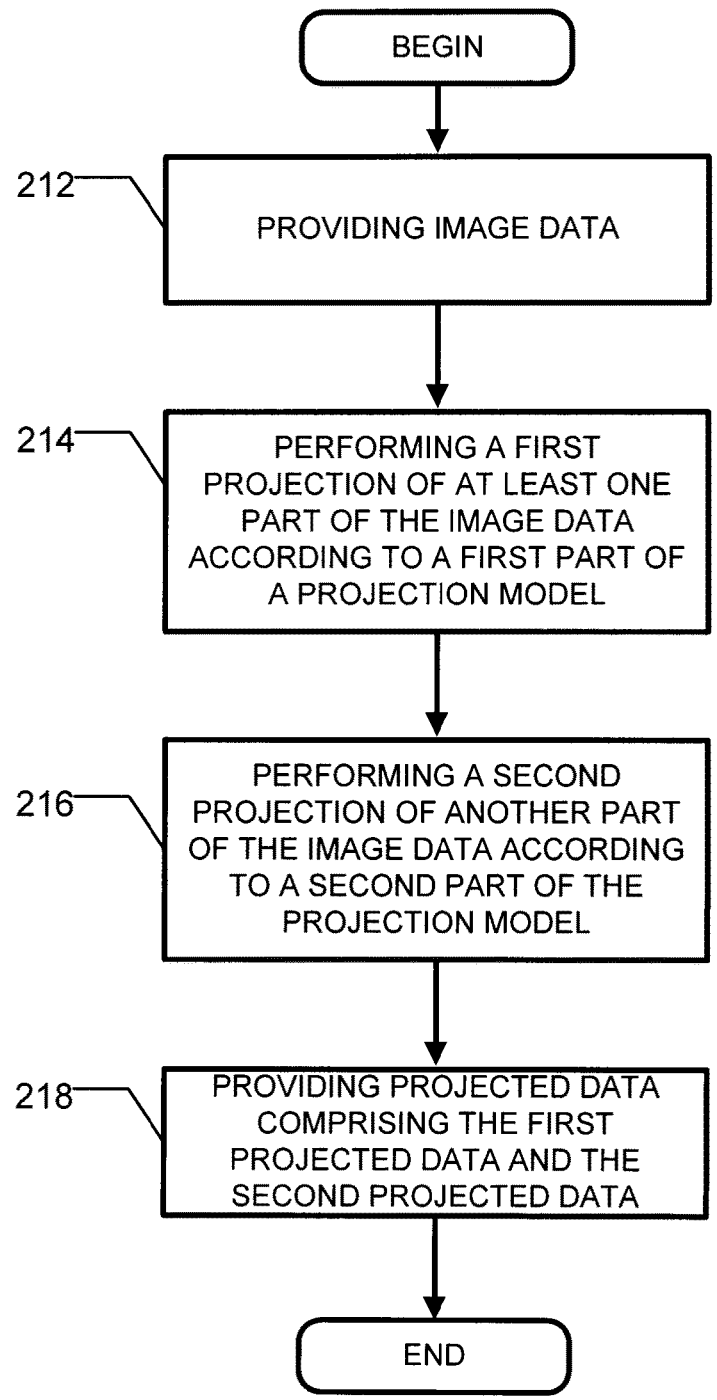
FIG. 2b is a flowchart which a second embodiment of a method for performing rendering at a given view point.

Now referring to FIG. 2b, there is shown a second embodiment of a method for performing rendering at a given view point.

According to processing step 212, image data is provided. In one embodiment, the providing of the image data comprises receiving the image data from a Digital Imaging and Communications in Medicine (DICOM) server.

According to processing step 214, a first projection of at least one part of the image data according to a first part of a projection model is performed. The projection model comprises the first part used for rendering far view and a second part for rendering near view such that at least one portion of the visual areas is rendered using the second part of the projection model and further wherein a transition between the first part of the projection model and the second part of the projection model is characterized by projection vectors substantially similar.

It will be appreciated by the skilled addressee that the projection model mentioned in the embodiment shown in FIG. 2b is identical to the projection model disclosed in FIG. 2a.

According to processing step 216, a second projection of another part of the image data is performed according to the second part of the projection model. Second projected data is generated accordingly.

According to processing step 218, projected data comprising the first projected data and the second projected data is provided.

In one embodiment, the providing of the projected data comprises displaying the projected data on a screen.

Figure 3:
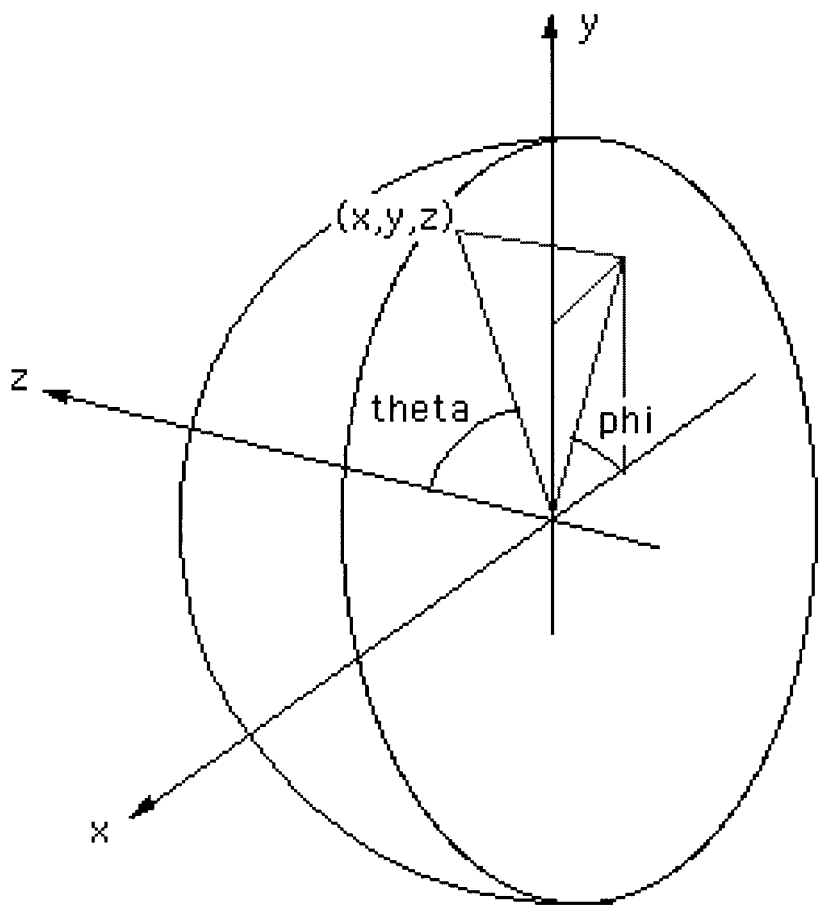
FIG. 3 is a schematic which illustrates a perspective view of a semispherical projection model.

In another embodiment, the providing of the projected data comprises performing at least one of storing the projected data and transmitting the projected data to a remote location. It will be appreciated that in one embodiment each of the first part of the projection model and the second part of the projection model is symmetrical around an axis extending from the given viewpoint to a projected viewpoint. Now referring to FIG. 3, there is shown an embodiment of a semispherical projection model. It will be appreciated that in one embodiment the semispherical projection model may be used as a first part of the projection model and may be used more precisely for rendering far view.

Figure 4:
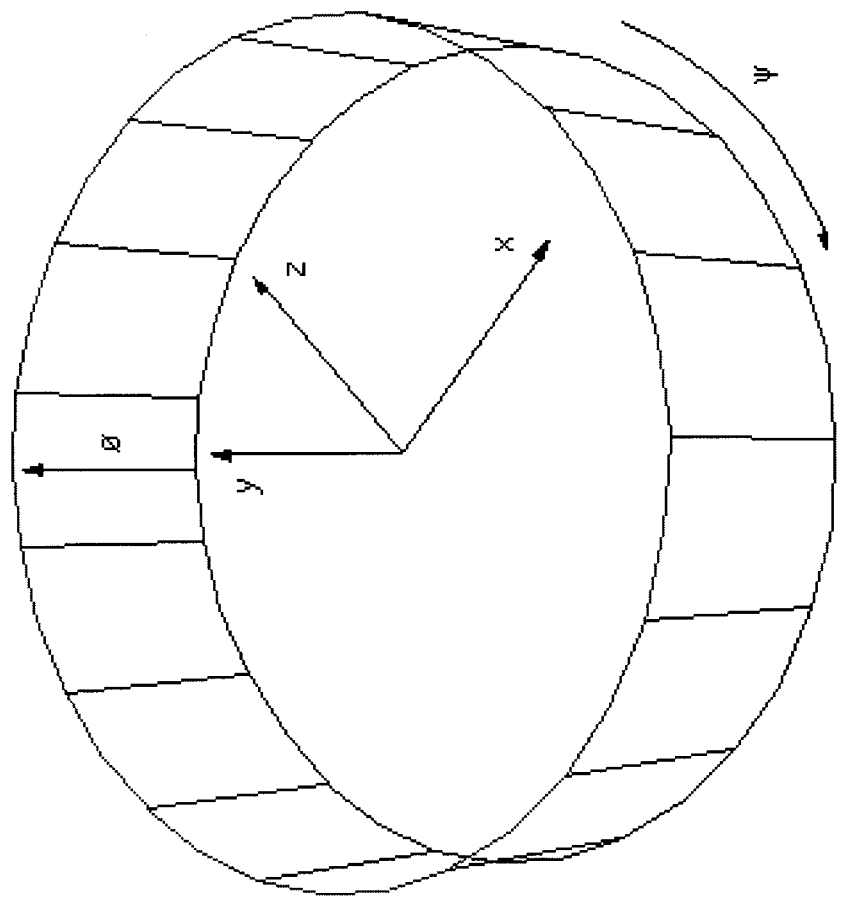
FIG. 4 is a schematic which illustrates a perspective view of a cylindrical projection model.

Referring to FIG. 4, there is shown an embodiment of cylindrical projection model. It will be appreciated that in one embodiment, the cylindrical projection model may be used as a second part of a projection model and may be used more precisely for rendering near view.

Figure 5:
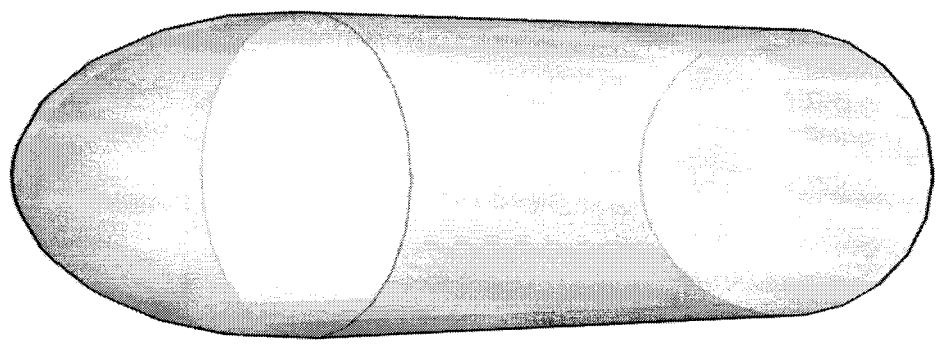
FIG. 5 is a schematic which shows a perspective view of a projection model comprising a first part and a second part wherein the first part comprises a semispherical projection model and further wherein the second part comprises a cylindrical projection model.

Now referring to FIG. 5, there is shown a perspective view of another embodiment of a projection model comprising a first part and a second part, wherein the semispherical projection model is the first part of the projection model and further wherein the cylindrical projection model is the second part of the projection model.

Figure 6A:
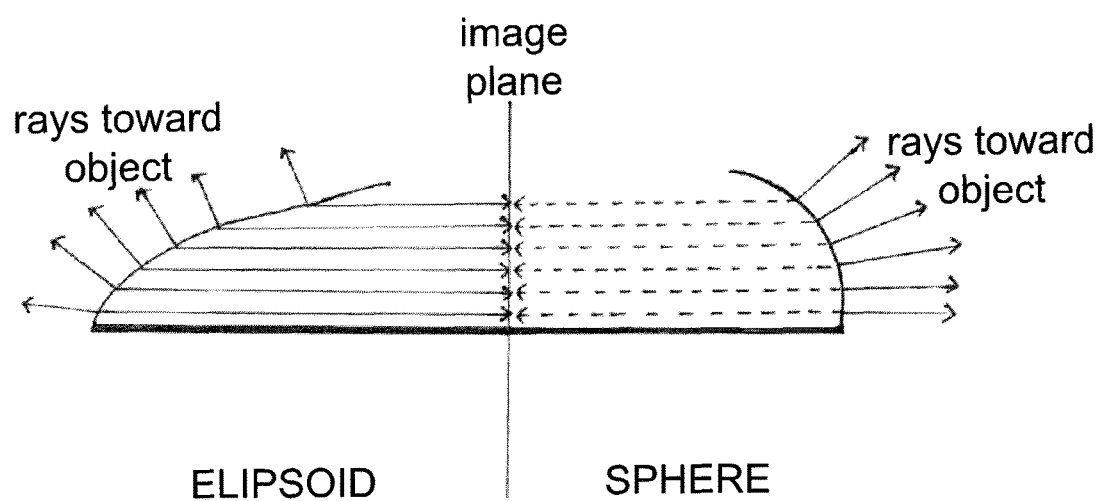

Now referring to FIG. 6a, there is shown how each point located on an ellipsoid of an ellipsoid projection model projects itself on a corresponding image plane. There is also shown how each point located on a semisphere of a semispherical projection model projects itself on the image plane.

It will be appreciated by the skilled addressee that in the embodiment of an ellipsoid projection model a greater accuracy and homogeneity is achieved along the projected image in the image plane, specifically near the projected view point. The skilled addressee will appreciate that this embodiment is particularly pertinent for a medical application since clinically speaking only large lesion can be seen from far away and smaller lesions are harder to discriminate.

Figure 6B:
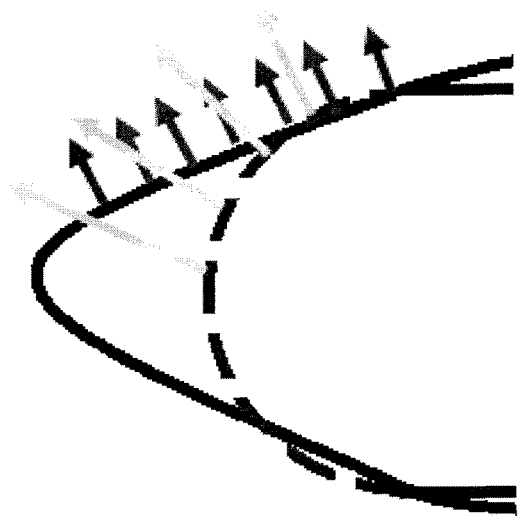
FIG. 6b shows a side elevation view of a semispherical projection model superimposed on an ellipsoid projection model.

FIG. 6b shows projection vectors at various surface points of a semisphere representing a semispherical projection model and at various points of an ellipsoid representing an ellipsoid projection model.

Figure 7:
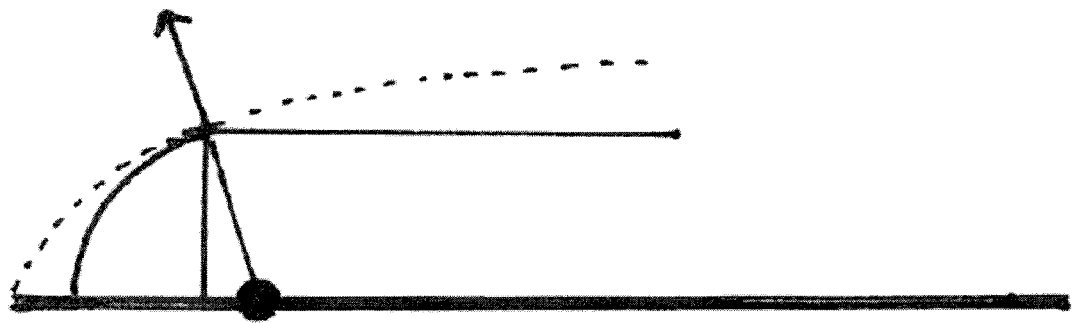
FIG. 7 is a schematic which shows a side elevation view of a first embodiment of a projection model comprising a first part and a second part, wherein the first part comprises a semispherical projection model and the second part comprises a cylindrical projection model and a second embodiment of a projection model, shown in stippled lines, and comprising a first part and a second part wherein the first part comprises an ellipsoid projection model and second part comprises a curved cylinder projection model.

Now referring to FIG. 7 there is shown a first embodiment of a projection model and a second embodiment of a projection model.

The first embodiment of the projection model comprises a first part and a second part. The first part of the projection model comprises a semisphere portion of a semispherical projection model while the second part of the projection model comprises a cylindrical projection model.

The second embodiment of the projection model, shown in stippled lines, comprises a first part and a second part. The first part of the projection model comprises a portion of an ellipsoid projection model while the second part of the projection model comprises a portion of a curved cylindrical projection model. It will be appreciated that FIG. 7 further shows a projection vector at a boundary between the first part of the projection model and the second part of the projection model. It will be appreciated that projection vectors at that boundary are substantially similar for each of the first embodiment of the projection model and the second embodiment of the projection model. Specifically, although the origin the both rays are different but close, the ray trajectory is substantially similar.

Figure 8A:
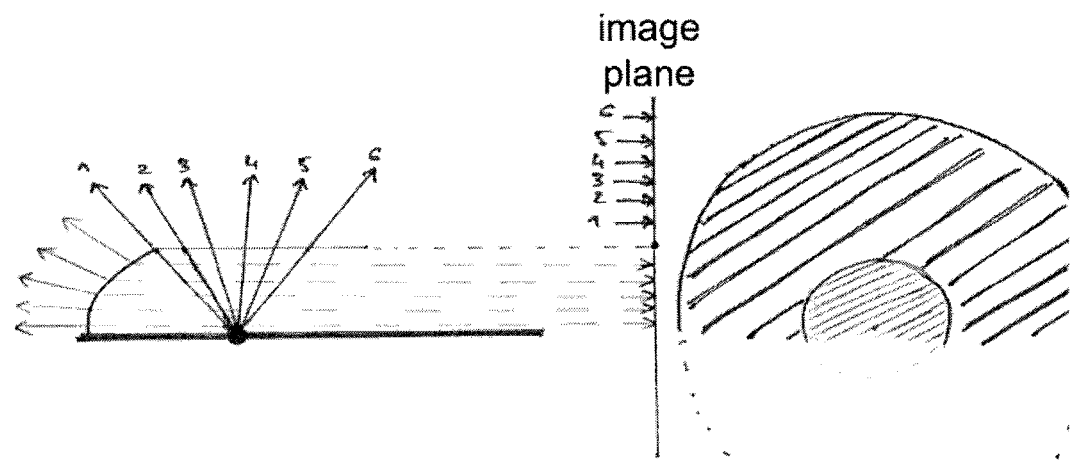
FIG. 8a is a schematic which shows a side elevation view of an embodiment of a projection model comprising a first part and a second part wherein the first part comprises a semispherical projection model and the second part comprises a cylindrical projection model and corresponding projected image generated using the projection model in an image plane.

Referring to FIG. 8a, there is shown an embodiment of a projection model comprising a first part and a second part. The first part comprises a semispherical projection model while the second part of the projection model comprises a cylindrical projection model. There is further shown a result from the projection of the projection model in the image plane.

As mentioned above, the transition between the first part of the projection model and the second part of the projection model is characterized by projection vectors substantially similar. This will enable a smooth and non-distorted transition between a portion of an image corresponding to a projection according to the first part of the projection model and a portion of an image corresponding to the second part of the projection model which is of great advantage when performing a fly through.

Figure 8B:
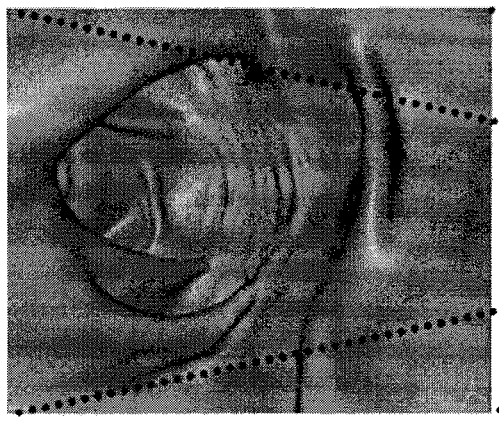
FIG. 8b is a screenshot showing an example in the image plane of the combination of a spherical projection with a cylindrical projection and an enlarged view of a result from the spherical projection.
Figure 8C:
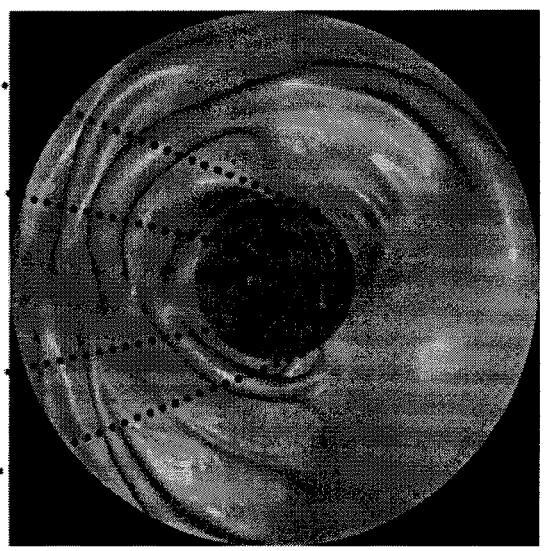

Referring now to FIG. 8c, there is shown a screenshot showing an example of projected image generated using the projection model disclosed in FIG. 8a. It will be appreciated that the area covered by the projected image is much larger than the area covered by a projected image generated according to prior art technique shown in FIG. 8b. The skilled addressee will further appreciate a smooth and non-distorted transition between a portion of the screenshot corresponding to a projection according to the first part of the projection model and a portion of the screenshot corresponding to the second part of the projection model.

Moreover and in the embodiment where each of the first part of the projection model and the second part of the projection model is symmetrical around an axis extending from the viewpoint to the projected viewpoint, it will be appreciated that the projected image is free of radial distortion which is of great advantage. The skilled addressee will appreciate that this is of great advantage since radial distortions can over emphasize or under emphasize the size of a lesion depending on its radial position which can complicate the task of a clinician as depicted in '039. Specifically, it can be seen that the embodiments of '039 presented in 312 and 412 render the same viewpoint, but depending on the mapping process the same haustral fold depicts different shape, respectively a squared shape in 312 and a round shape in 412. Furthermore, the closer to the transition of 308/306 for example, the more distortion an observer will see.

Figure 9A:
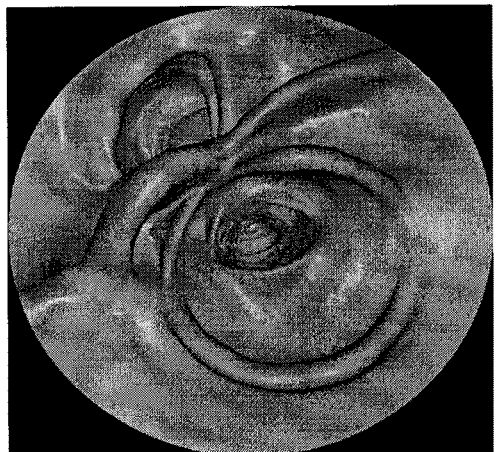
FIG. 9a is a screenshot of an image generated during a rectum-caecum fly-through and that have been generated according to an embodiment of the method disclosed herein.
Figure 9B:
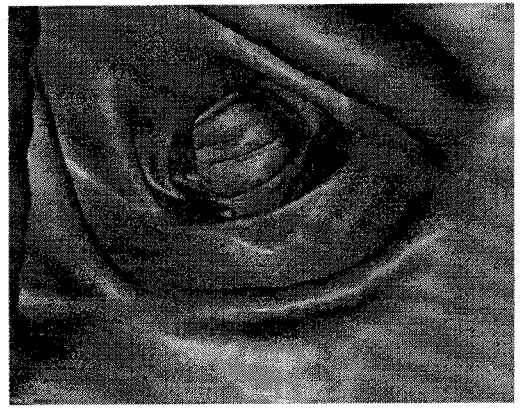
FIG. 9b is a screenshot of an image generated during a rectum-caecum fly-through and that has been generated according to a prior art perspective rendering.

Now referring to FIG. 9B, D, there are shown images originating from either a rectum-caecum fly-through or a caecum-rectum fly-through and that have been generated according to a prior art perspective rendering. Those images fail to show an in-between fold lesion of 6 mm. More precisely, FIG. 9B shows an image generated during a rectum-caecum fly-through while FIG. 9D shows an image generated during a caecum-rectum fly-through.

Figure 9C:
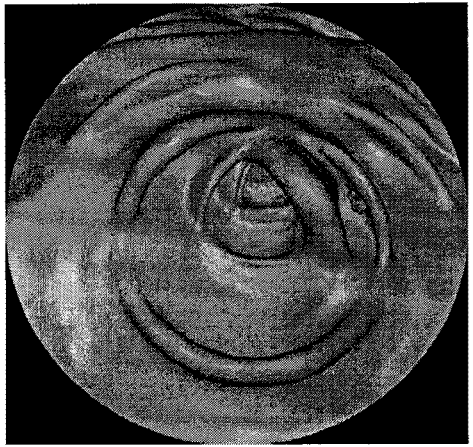
FIG. 9c is a screenshot of an image generated during a caecum-rectum fly-through and that have been generated according to an embodiment of the method disclosed herein.
Figure 9D:
FIG. 9d is a screenshot of an image generated during a caecum-rectum fly-through and that has been generated according to a prior art perspective rendering.
Figure 9E:
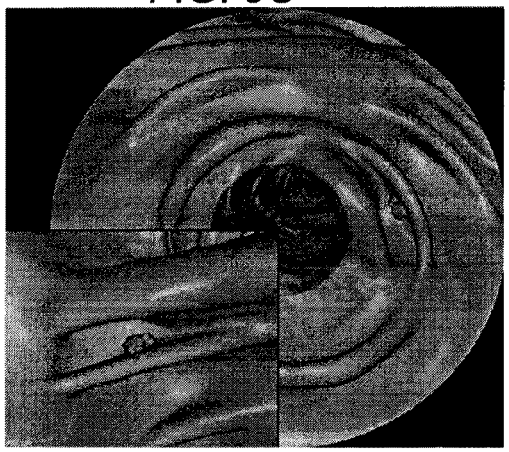
FIG. 9e is a screenshot showing a locally embedded perspective rendering of the lesion located as clicked by an observer for further examination.
Figure 9F:
FIG. 9f is a screenshot showing the lesion on the traditional perspective rendering by manually rotating the 3D camera to a position different than its normal fly-through trajectory.

FIGS. 9A, 9C and 9E show images originating from either a rectum-caecum fly-through or a caecum-rectum fly-through and that have been generated according to the method disclosed herein and which show that the 6 mm lesion would have been uncovered in all cases. More precisely, FIG. 9A shows an image generated during a rectum-caecum fly-through while FIG. 9C shows an image generated during a caecum-rectum fly-through.

FIG. 9E shows a locally embedded perspective rendering of the lesion located as clicked by the observer for further examination. It will be appreciated that both perspective renderings are similar.

Figure 10A:
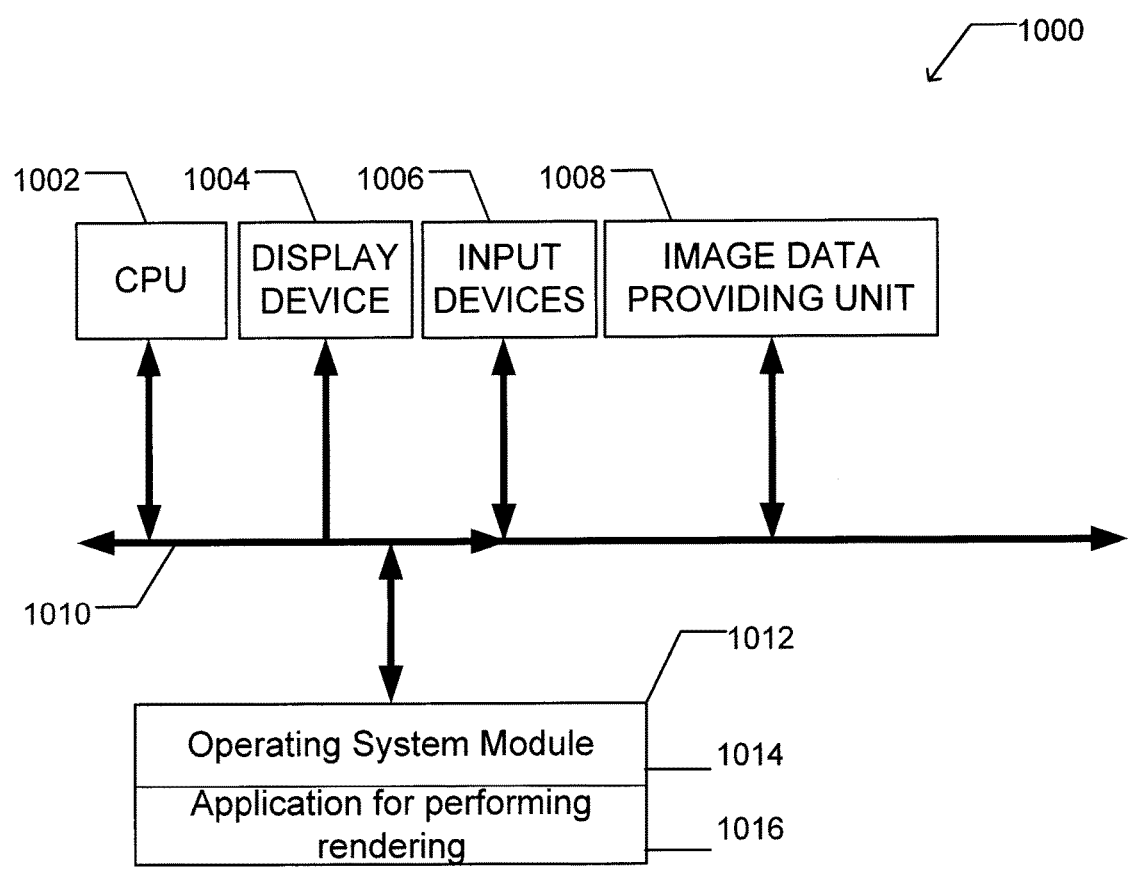
FIG. 10a is a block diagram which shows a first embodiment of a system for performing rendering at a given viewpoint.

Now referring to FIG. 10a, there is shown an embodiment of a system 1000 for performing rendering at a given viewpoint.

The system 1000 comprises a central processing unit (CPU) 1002, a display device 1004, input devices 1006, an image data providing unit 1008, a data bus 1010, a memory 1012.

The central processing unit (CPU) 1002, the display device 1004, the input devices 1006, the image data providing unit 1008 and the memory 1012 are each operatively coupled via the data bus 1010.

The central processing unit (CPU) 1002 is used for executing computer readable instructions. The skilled addressee will appreciate that various embodiments of the central processing unit (CPU) 1002 may be provided. In a preferred embodiment, the central processing unit (CPU) 1002 is one of a workstation and a laptop.

The display device 1004 is used for displaying an image. The skilled addressee will appreciate that various embodiments of the display device 1004 may be provided. In a preferred embodiment, the display device 1004 is a computer screen or handled device.

The input devices 1006 are used for enabling an operator to interact with the system 1000. The skilled addressee will appreciate that various embodiments of the input devices 1006 may be provided. In a preferred embodiment, the input devices 1006 comprise a mouse and a keyboard.

The image data providing unit 1008 is used for providing image data to the system 1000. The skilled addressee will appreciate that various embodiments of the image data providing unit 1008 may be provided. In a preferred embodiment, the image data providing unit 1008 is selected from a group consisting of a hard drive, a memory, a communication interface to an imaging system, a PACS system and a CT scanner. It will be appreciated that the image data providing unit 1008 may also be referred as an input device.

The memory unit 1012 is used for storing data. The skilled addressee will appreciate that various embodiments of the memory unit 1012 may be provided. In a preferred embodiment, the memory unit 1012 comprises an operating system module 1014 and an application for performing rendering 1016. Still in a preferred embodiment, the operating system module 1014 is Windows 7™ manufactured by Microsoft™. The application for performing rendering 1016 comprises instructions for obtaining image data from the image data providing unit 1008. The application for performing rendering 1016 further comprises instructions for performing a first projection of at least one part of the image data according to a first part of a projection model, the projection model comprising the first part used for rendering far view and a second part for rendering near view such that at least one portion of the visual areas is rendered using the second part of the projection model and further wherein a transition between the first part of the projection model and the second part of the projection model is characterized by projection vectors substantially similar. The application for performing rendering 1016 further comprises instructions for performing a second projection of another part of the image data according to the second part of the projection model to generate second projected data. The application for performing rendering 1016 further comprises instructions for generating projected data using the first projected data and the second projected data. The application for performing rendering 1016 further comprises instructions for providing the generated projected data to the display device. It will be appreciated that the application for performing rendering 1016 may further comprises instructions for transmitting the generated projected data to an output device, not shown in FIG. 10a, which may be used for performing at least one of storing the generated projected data and transmitting the generated projected data to a remote processing unit.

Figure 10B:
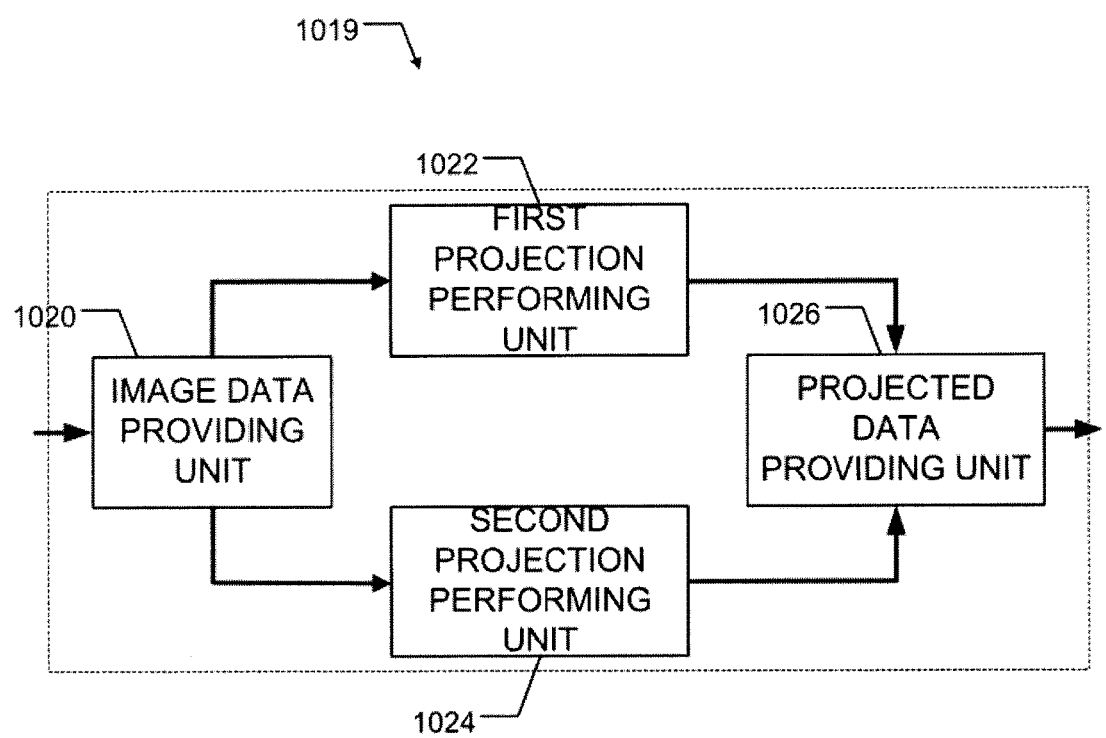
FIG. 10b is a block diagram which shows a second embodiment of a system for performing rendering at a given viewpoint.

Now referring to FIG. 10b, there is shown a second embodiment of a system 1019 for performing rendering at a given viewpoint.

The system 1019 for performing rendering at a given viewpoint comprises an image data providing unit 1020. The image data providing unit 1020 is used for receiving and providing image data.

The system 1019 for performing rendering at a given viewpoint further comprises a first projection performing unit 1022. The first projection performing unit 1022 is used for performing a projection of at least one part of the provided image data according to a first part of a projection model. The projection model comprises the first part used for rendering far view and a second part for rendering near view such that at least one portion of the visual areas is rendered using the second part of the projection model and further wherein a transition between the first part of the projection model and the second part of the projection model is characterized by projection vectors substantially similar. The first projection performing unit 1022 is further used for providing a first projected data.

The system 1019 for performing rendering at a given viewpoint further comprises a second projection performing unit 1024. The second projection performing unit 1024 is used for performing a projection of another part of the provided image data according to the second part of the projection model and for providing a second projected data.

The system 1019 for performing rendering at a given viewpoint further comprises a projected data providing unit 1026. The projected data providing unit 1026 is used for receiving the first projected data and the second projected data, for generating projected data using the first projected data and the second projected data and for providing the projected data.

Also, it will be appreciated that a computer-readable storage medium may be provided for storing computer-executable instructions. Such computer-executable instructions would cause a computing device, when executed, to perform a method for performing rendering at a given viewpoint of at least one portion of visual areas blinded to a perspective rendering at the given viewpoint, the method comprising providing a projection model comprising a first part used for rendering far view and a second part for rendering near view such that at least one portion of the visual areas is rendered using the second part of the projection model and further wherein a transition between the first part of the projection model and the second part of the projection model is characterized by projection vectors substantially similar; obtaining image data; performing a first projection of at least one part of the image data according to the first part of the projection model to generate first projected data; performing a second projection of another part of the image data according to the second part of the projection model to generate second projected data and displaying projected data using the first projected data and the second projected data.

While this has not been illustrated in the figures, it will be appreciated that in an alternative embodiment, the view point may not coincide with a camera position, or a camera position may change depending on the object shape, or alternatively the viewpoint may change depending on the object shape for a given camera position.

While it has been described that the present invention may be used in the context of CT colonography. The skilled addressee will appreciate that the present invention may be used with any type of two or three dimensional imaging systems for the purpose of viewing internal structures of an object. More particularly, it is well suited for the examination of hollow organs through virtual endoscopy. In an alternative embodiment, the method disclosed herein may be used in non-medical applications that involve two or three dimensional imaging. One such application would be for the evaluation of pipes and identification of cracks.

The invention claimed is:

1. A method for performing rendering at a given viewpoint of at least one portion of visual areas blinded to a perspective rendering at the given viewpoint, the method comprising:
providing a projection model comprising a first part used for rendering far view and a second part for rendering near view such that at least one portion of the visual areas is rendered using the second part of the projection model and further wherein a transition between the first part of the projection model and the second part of the projection model is characterized by projection vectors which, while not necessarily having the same origin, meet at a same location at the object to be visualized;
obtaining image data;
performing a first projection of at least one part of the image data according to the first part of the projection model to generate first projected data;
performing a second projection of another part of the image data according to the second part of the projection model to generate second projected data;
displaying projected data using the first projected data and the second projected data.

2. The method as claimed in claim 1, wherein the first part of the projection model comprises a semisphere portion of a semispherical projection model, further wherein the second part of the projection model comprises a cylindrical projection model.

3. The method as claimed in claim 2, wherein the semispherical projection model is characterized by:

$$0 \leq r \leq R1 = Rc \, \overrightarrow{n(r)} \begin{cases} r/Rs \\ \theta \\ \sqrt{Rs^2 - r^2}/Rs \end{cases}$$

4. The method as claimed in claim 2, wherein the cylindrical projection model is characterized by:

$$Rc = R1 \leq r \leq R3 = 3 \cdot Rc \, \overrightarrow{n(r)} \begin{cases} Rc/\sqrt{Rc^2 + (r-R2)^2} \\ \theta \\ (r-R2)/\sqrt{Rc^2 + (r-R2)^2} \end{cases}$$

5. The method as claimed in claim 1, wherein the first part of the projection model comprises a portion of an ellipsoid projection model, further wherein the second part of the projection model comprises a curved cylindrical projection model.

6. The method as claimed in claim 1, wherein each of the first part of the projection model and the second part of the projection model is symmetrical around an axis extending from the given viewpoint to a projected viewpoint.

7. A non-transitory computer-readable storage medium storing computer-executable instructions which, when executed, cause a processing device to perform the method as claimed in claim 1.

8. Use of the method as claimed in claim 1 for performing a fly-through.

9. A method for performing rendering at a given viewpoint of at least one portion of visual areas blinded to a perspective rendering at the given viewpoint, the method comprising:
providing image data;
performing a first projection of at least one part of the image data according to a first part of a projection model, the projection model comprising the first part used for rendering far view and a second part for rendering near view such that at least one portion of the visual areas is rendered using the second part of the projection model and further wherein a transition between the first part of the projection model and the second part of the projection model is characterized by projection vectors which, while not necessarily having the same origin, meet at a same location at the object to be visualized;
performing a second projection of another part of the image data according to the second part of the projection model to generate second projected data;
providing projected data comprising the first projected data and the second projected data.

10. The method as claimed in claim 9, wherein the providing of the image data comprises receiving the image data from a device selected from a group consisting of a magnetic resonance imaging (MRI) device, a positron emission tomography (PET) device, an X-rays device, an ultrasound device and any combination thereof.

11. The method as claimed in claim 9, wherein the providing of the projected data comprises displaying the projected data on a screen.

12. The method as claimed in claim 9, wherein the providing of the projected data comprises performing at least one of storing the projected data and transmitting the projected data to a remote location.

13. The method as claimed in claim 9, wherein the providing of the image data comprises receiving the image data from a DICOM server.

14. A system for performing rendering at a given viewpoint of at least one portion of visual areas blinded to a perspective rendering at the given viewpoint, the system comprising:
a display device;
an image data providing unit;
a central processing unit;
a memory comprising a program, wherein the program is stored in the memory and configured to be executed by the central processing unit, the program comprising:
instructions for obtaining image data from the image data providing unit;
instructions for performing a first projection of at least one part of the image data according to a first part of a projection model, the projection model comprising the first part used for rendering far view and a second part for rendering near view such that at least one portion of the visual areas is rendered using the second part of the projection model and further wherein a transition between the first part of the projection model and the second part of the projection model is characterized by projection vectors which, while not necessarily having the same origin, meet at a same location at the object to be visualized;
instructions for performing a second projection of another part of the image data according to the second part of the projection model to generate second projected data;
instructions for generating projected data using the first projected data and the second projected data;
instructions for providing the generated projected data to the display device.

15. The system as claimed in claim 14, further comprising an output device, further wherein the program comprises instructions for transmitting the generated projected data to the output device.

* * * * *